Sept. 1, 1942.  K. BÖLTE  2,294,712
TRANSFORMER TAP CHANGER ARRANGEMENT
Filed July 31, 1940
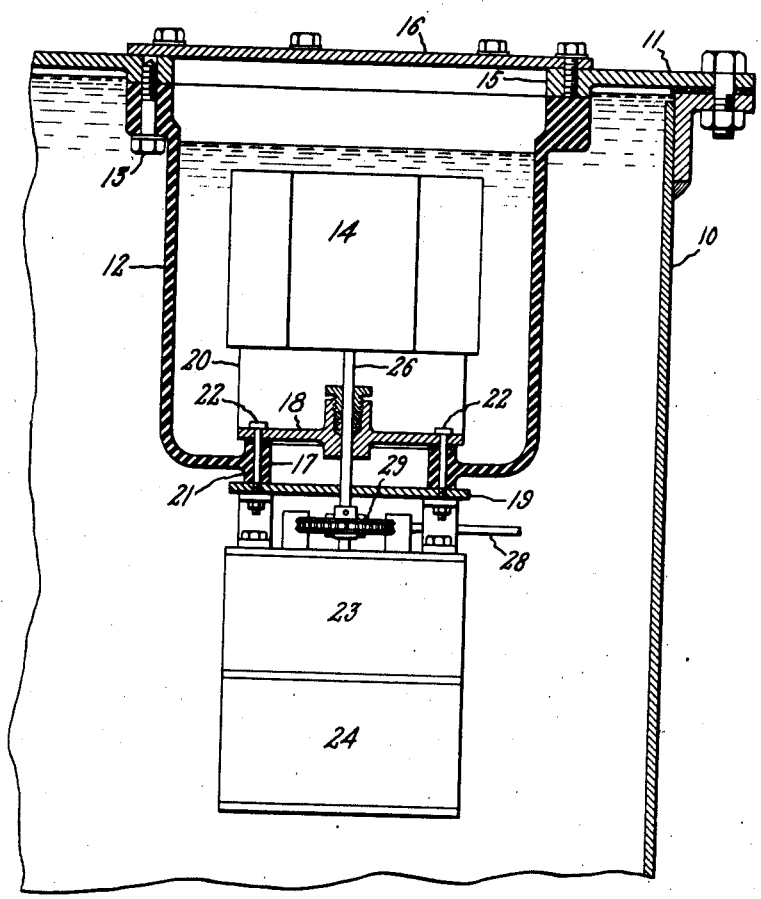
Inventor:
Karl Bölte,
by Harry E. Dunham
His Attorney.

Patented Sept. 1, 1942

2,294,712

UNITED STATES PATENT OFFICE 2,294,712

TRANSFORMER TAP CHANGER ARRANGEMENT

Karl Bölte, Berlin-Karlshorst, Germany, assignor to General Electric Company, a corporation of New York Application July 31, 1940, Serial No. 348,959
In Germany August 4, 1939

3 Claims. (Cl. 171—119)

The present invention relates to transformer tap changer arrangements comprising load switches and tap selectors.

Transformers are usually arranged within an enclosing tank which is filled with a suitable insulating liquid such as oil. For changing the transformer taps under load, switching apparatus is provided comprising one set of load switches and a second set of selector switches. For obvious reasons, arcing cannot be tolerated within the transformer tank in communication with the body of insulating liquid contained therein so it is a customary practice to locate the arcing load switches on the outside of the tank, usually at the end of a bushing extending through the tank wall, and to mount the non-arcing tap selectors at the opposite end of the bushing inside the transformer tank. Because of the relatively high voltages usually involved, the bushings used must generally be relatively large and, accordingly, correspondingly expensive. In the case of larger sized transformers such bushings moreover materially increase the overall dimensions of the transformer making the transportation thereof, as over railroads, a difficult matter.

It is an object of this invention, therefore, to provide a transformer tap changer arrangement, including load switches and tap selectors, which eliminates the necessity of bushings extending through the transformer tank wall therebetween.

It is a further object of the invention to provide a new and improved transformer tap changer arrangement which is compact in design and facilitates the handling and shipment of the transformer.

Further objects and advantages of the invention will appear from the following description and the claims appended thereto taken in connection with the accompanying drawing, the single figure of which is a diagrammatic representation of a transformer tap changer arrangement constructed in accordance with the invention.

Referring to the drawing, 10 indicates a transformer tank having a cover 11, to the under side of which is attached an insulating casing 12 by means of suitably arranged bolts 13. The casing 12 may be of any suitable insulating material such as porcelain and contains the transformer tap changer load switch mechanism indicated at 14. The cover 11 is provided with an opening 15 therethrough communicating with the interior of the casing 12, the opening being normally closed as by a removable cover plate 16. The bottom of the casing 12 is provided with an opening 17 which may be closed in a fluid tight manner as by means of metal plates 18 and 19 clamped on opposite sides of the casing flange portion 21 surrounding the opening 17 by means of bolts 22. The load switch may be mounted upon the upper plate 18 by means of a suitable bracket 20. The two halves of the selector switch mechanism indicated at 23 and 24 may be rigidly attached as by brackets 25 to the lower metal plate 19. The load switch 14 and the selector switch mechanism 23, 24 may be interconnected by a common operating shaft 26 which extends through a wall of the insulating casing and driven by shaft 28 through gearing 29 by a suitable motor operating device (not shown).

The specific details for the load switch 14 and the tap selector switch mechanism 23, 24 and the circuit connections therefor form no part of the present invention, since such apparatus is well known in the art. One typical load switch and tap selector switch arrangement is disclosed in Patent No. 2,112,064, issued to Mr. Louis F. Blume, March 22, 1938.

The insulating casing 12 of the instant arrangement may be filled with a suitable insulating liquid the level thereof being below the upper edge of the casing and the casing is suspended from the cover within the tank so that the casing extends into the insulating liquids within the tank. Since the insulating liquid within the casing 12 is sealed from the insulating liquid within the main transformer tank and surrounding the casing 12, arcing of the contacts of the load switch 14 will not result in contamination of the oil within the main tank.

The load switch 14 and the tap selector switch mechanism being arranged within the metal tank 10, no bushings therethrough are required for interconnecting the switch devices. Since externally extending bushings for the tap changer apparatus are eliminated by this arrangement, the overall dimensions for the transformer are materially reduced greatly facilitating the handling and shipment thereof.

While I have shown and described a particular embodiment of my invention, it will be obvious to those skilled in the art that changes may be made therein without departing from my invention and I therefore aim in the appended claims to cover all such changes and modifications as fall within the true spirit and scope of my invention.

What I claim as new and desire to secure by Letters Patent of the United States is:

1. In combination, a transformer having an enclosing tank containing an insulating liquid, a cover for said tank, tap changer apparatus for said transformer, a casing of insulating material suspended from said cover within said tank and extending into the insulating liquid, the interior of said casing being fluid tight from space in said tank exterior of said casing, arcing contacts of said tap changer apparatus arranged within said casing and a selector switch mechanism arranged within said tank outside of said casing, said switches being interconnected by a common operating shaft extending through a wall of said casing.

2. In combination, a transformer having an enclosing housing containing an insulating liquid, a cover for said housing, an insulating casing suspended from said cover within said housing and extending into the insulating liquid, tap changer apparatus for said transformer located entirely within said housing, said apparatus comprising a load switch arranged within said insulating casing and a selector switch arranged in said housing exteriorly of said casing, and a common operating shaft extending through a wall of said casing and interconnecting said switches.

3. In combination, a transformer comprising a housing containing an insulating liquid, a cover for said housing, a casing of insulating material suspended from said cover, said casing being located entirely within said housing and immersed in said liquid, an insulating liquid within said casing, tap changer apparatus for said transformer located wholly within said housing, said apparatus including a load switch arranged within said casing and a selector switch secured to said casing on the opposite end thereof with respect to said cover, a common operating shaft extending through a wall of said casing between said load switch and said selector switch and interconnecting said switches, the interior of said casing being substantially fluid tight from the interior of said housing.

KARL BÖLTE.